July 17, 1962 I. L. AUERBACH 3,045,211

BISTABLE CIRCUITS

Filed Aug. 1, 1952 2 Sheets-Sheet 1

INVENTOR
ISAAC L. AUERBACH
BY
Laurence R. Brown
ATTORNEY

INVENTOR
ISAAC L. AUERBACH
BY
Laurence R. Brown
ATTORNEY

United States Patent Office 3,045,211

Patented July 17, 1962

3,045,211

BISTABLE CIRCUITS

Isaac L. Auerbach, Philadelphia, Pa., assignor to Burroughs Corporation, Detroit, Mich., a corporation of Michigan Filed Aug. 1, 1952, Ser. No. 302,217
22 Claims. (Cl. 340—172.5)

This invention relates to computer circuits and, more particularly, it relates to electronic computer circuits having visible indication panels for showing the state of internal computer circuit conditions.

On expedient commonly used for indicating circuit conditions within electronic systems is the connection of neon tubes to one output resistor of a multivibrator or other dynamically conducting bistable state flip flop circuit. The neon tubes, therefore, will readily tell the state of operation of the flip flop circuit and will display the indication until some further internal command causes the flip flop circuit to change its conduction state. Such means may be used to provide read-out circuits for transferring dynamic indications from an electrical register having flip flop storage circuits to a visual panel. Some bistable state circuits however do not provide dynamic indications but reside in one of two static conditions, as for example, north or south pole permanent magnetic states. Thus the transfer of circuit conditions to an indication panel is not readily accomplished by the means utilized heretofore. The present invention is therefore directed to improved means for transferring information from a statically stored register circuit to an indicating panel.

In addition, it is highly desirable in some instances to afford a reading indication of the circuit condition of a dynamically operating circuit after a momentary contact to thereby permanently store the information until a further read-out or interrogation signal resets the read-out device for a further indicating cycle. However, this type of indicator circuit should be provided with a power supply external to the dynamic circuit conditions to prevent variations in the potential of the register from causing instability or erroneous operation of the indicator panel. Indicator circuits should also provide read-out information without destroying registered data denoted by the internal circuit conditions since this data may be utilized for further calculation steps.

In operation the principal register may therefore comprise a series of bistable circuits arranged in cascade to represent binary words comprising a series of binary bits. The words indicated by a respective preselected order of stable conditions in the cascade circuits then may be transferred to an indicating panel. In this case a bistable indicator circuit might be actuated by a momentary dynamic impulse from the principal register to provide a suitable voltage pulse for permanently changing the indicator panel state of operation until the panel is reset into its initial condition. Since conventional bistable indicators necessitate the provision of flip flop circuits embodying two electronic tubes and the necessary interconnecting circuit components for each possible indication digit, and thereby become too expensive for general use, there are utilized in this invention improved and simplified neon tube indicator circuits.

Advantage is therefore taken of the characteristics of neon type glow discharge tubes in the present invention to afford one stable state when the glow tubes are extinguished and another when they are maintained in a discharge condition. Since glow tubes require a higher potential for firing or initiating a discharge than for maintaining the discharge, an electrical pulse superimposed on a constant potential having a magnitude in the maintaining region may be used to initiate one stable condition. Likewise, a pulse may be superimposed for reducing the maintaining potential below the maintaining threshold to extinguish the discharge and initiate the other stable state.

It is an object of the present invention therefore to provide improved inexpensive indicator means for computer circuits.

Another object of the invention is to provide an inexpensive indicator read-out register which stores the indication for an indefinite period of time upon momentary read-out contact with a principal register circuit.

Still another object of the invention is to provide an improved and efficient indicator circuit for computer systems which does not destroy or change the operating state of the principal register during the read-out or interrogation process.

Further it is an object of the invention to produce an improved computer system combination having bistable state discharge circuits utilizing neon type glow discharge tubes for indicating and storing the internal circuit conditions prevailing in a principal step-by-step shift register.

In accordance with the teachings of the invention therefore there is provided in one specific embodiment a magnetic shift register having a neon tube indicator panel, with a power supply source connected to provide to the neon tubes a constant potential less than the firing potential and in the discharge maintaining potential region of the tubes. The indicator panel is adapted for momentary contact by switch contacts, or the like, to the principal computer magnetic register by means of associated isolating circuits which present to individual indicator tubes a potential above the firing threshold when the magnetic bistable circuits are shifted from one state of operation to another. Thus, the discharge condition of individual neon indicator tubes is an indication of the internal static condition of the magnetic register. The indicator means is selectively reset for further indication by momentarily interrupting the maintaining potential of the indicator tubes thereby decreasing the potential below the maintaining potential threshold and extinguishing the discharge in all tubes.

Further features and objects of the invention will be found throughout the more detailed description of the invention which follows, particularly when considered in connection with the accompanying drawing; in which.

Figures 1, 4:
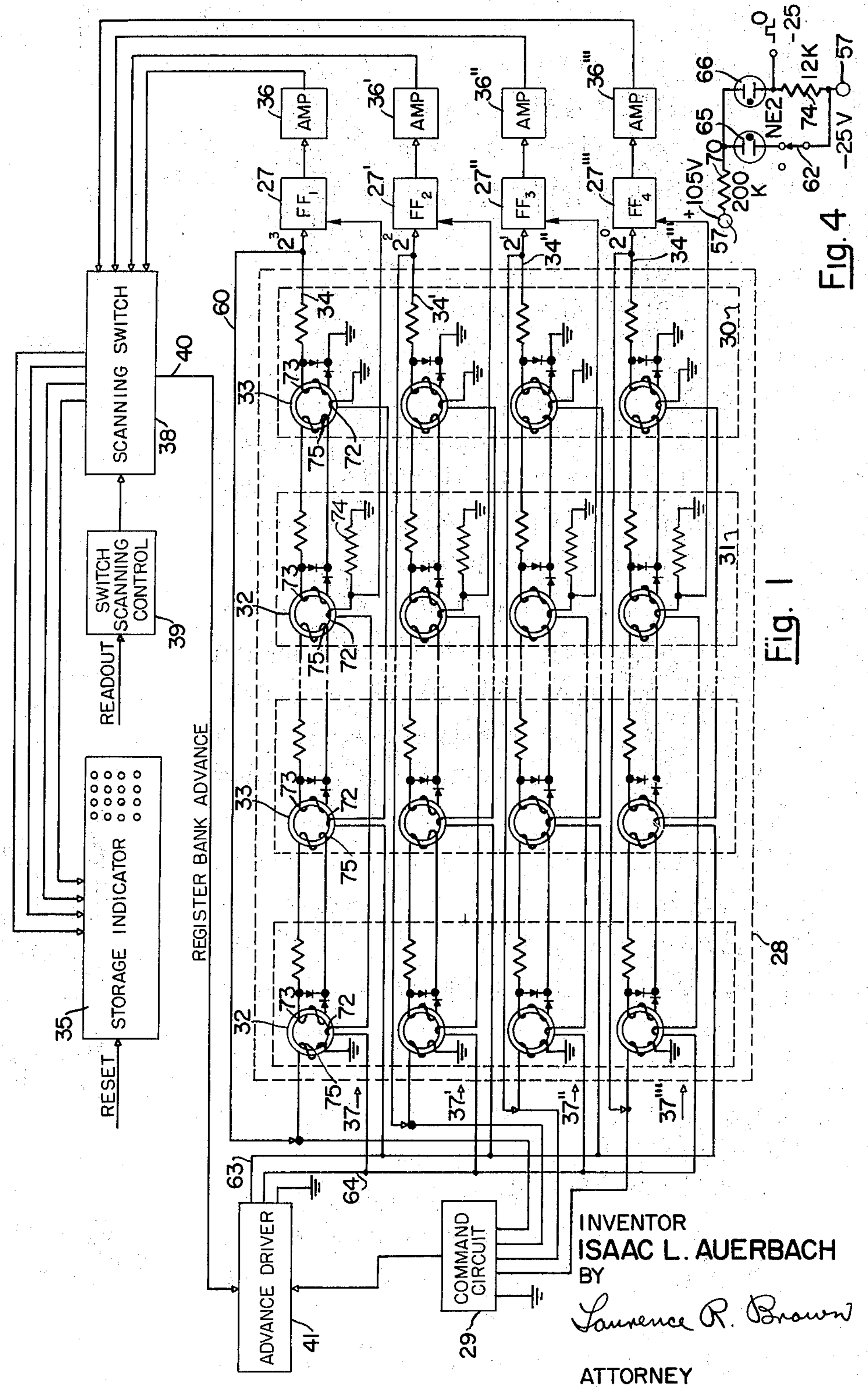
FIG. 1 is a combined block and schematic circuit diagram of a magnetic shift register system embodying the invention.
FIG. 4 is a simplified circuit diagram of a further bistable indicator circuit used in accordance with the invention.

Throughout this specification like circuit elements will be designated by similar reference characters to facilitate comparison. Those elements which of themselves may be readily reproduced by those skilled in the art are shown in block diagram form to more readily indicate the nature and scope of the invention.

Referring now with particularity to FIG. 1 of the drawing, the dotted block 28 designates a principal electronic register having a series of storage banks, each bank comprising two columns of cores 30 and 31 for storing a decimal digit comprising several bits. Each bit is represented by predetermined static magnetic conditions afforded in one of each pair of magnetic elements 32 and 33 in response to input signals from a suitable computing device such as the command circuit 29. The storage banks 30, 31 therefore each include bistable magnetic elements for storing the bits of the binary digit $2^3$, $2^2$, $2^1$, $2^0$. The illustrated magnetic circuits along each row 37, $37^1$, etc. are placed in an ordered series of prescribed electrical circuit conditions representing binary words by suitable computer networks contained in the command circuit 29. Static magnetic storage systems of this type are known in the art as evidenced by the A. Wang et al. article entitled "Static Magnetic Storage and Delay Line," published in the January 1950 Journal of Applied Physics, vol, 21, No. 1. As described in the A. Wang article, one binary digit is stored in two adjacent cores 32 and 33.

Thus, after storage of suitable words in the principal register circuit 28, if each magnetic condition is shifted along the register from bank to bank by means of pulses from the advance driver circuit 41, a series of four bit numbers is dynamically represented by corresponding momentary voltage impulses at the register output leads 34 upon the successive shifting of the internal condition out of the cores 33 of the column 30 of the last bank 30, 31.

Upon a predetermined read-out signal actuating the advance driver circuit 41, each bank of bistable circuits 30, 31 is thus adapted by the magnetic shift for successive step-by-step presentation of conditions to the output leads 34 and accordingly restoring the information into the first register bank by means of the feedback lead 60 until the register is restored to its initial condition to complete a single read-out cycle and thereby preserve the originally stored data. An external indicator circuit is then connected to the register output leads 34 for actuation by the series of dynamically presented pulses to permanently store the indication in accordance with the present invention. Thus, in the described principal register 28 each storage bank will present a signal designating a four bit decimal digit with the order of the bits $2^3$, $2^2$, $2^1$, $2^0$ indicated at the register output leads 34. It is to be realized that the number of banks and bits desired to give corresponding binary words or digits may be extended by those skilled in the art to meet the individual needs of different computer circuits and in FIG. 1 only the first and last storage banks 30, 31 of the register are shown in detail.

An external indicator or read-out register 35 is provided for storing the display indication transferred from the respective storage banks in response to the momentary dynamic signals at leads 34. A neon glow tube indicator circuit is provided in accordance with this phase of the invention to have two stable states of operation adapted to indicate and store a display indication of the principal register circuit condition in response to the described impulse actuation or other momentary actuation by dynamic read-out impulses from an electrical register of an electronic computer circuit. The storage bank conditions of the register 28 are in this manner sequentially presented at the output leads 34 to transfer computer data to the indicator register 35 for a series of entire binary words after which time the circuit conditions of the storage banks in the principal register 28 are restored to their initial position so that other use may be made thereof.

Multivibrators or other type of flip flop circuits 27, $27^1$, etc. and amplifiers 36, $36^1$, etc. may be connected between the principal register output leads 34 and the scanning switch 38 to afford electrical isolation and amplification, should there not be enough output energy afforded at the register output leads 34. The flip-flop circuits 27 may be in the form shown in FIG. 8 on page 8–VIII–11 of Progress Report No.8 under Contract W19–122–ac–24 published by the Computation Laboratory of the Harvard University, Cambridge, Massachusetts. Signal pulses are therefore applied to both the scanning switch circuit 38 and the advance driver circuit 41 for simultaneously advancing the register banks into position while actuating the corresponding neon tubes of indicator register 35 in succession.

The scanning switch 38 may be of the solenoid actuated stepping type initiated by a switch scanning control circuit 39 to progress through a read-out cycle affording signals from each of the principal register banks 30, 31, etc. in response to a suitable read-out signal afforded by manual switch control or an electronic signal.

Coupling of the scanning switch circuit to the step-by-step register 28 by way of lead 40 and the advance driver circuit 41 permits the register storage bank information to progressively be presented for transfer to the indicator register 35 in synchronism with the connection of read-out register indicator banks to the register output leads 34 by means of the scanning switch 38.

Alternate pulses are provided at output leads 63 and 64 of the advance driver 41 in response to each successive register advance signal pulse from the scanning switch 38. These pulses are then alternately coupled to every other magnetic element or column 30, 31, etc. of magnetic elements along each row 37, $37^1$, etc. of units in the principal register. As described in the A. Wang article hereinbefore mentioned the static magnetic elements reside in one of two permanent magnetic conditions arbitrarily designated as "0" and "1." When the driver stage 41 provides an advancing pulse of a predetermined reference polarity different than that of the stored static condition an output pulse is generated in winding 73 and transferred to the input winding 75 of a succeeding element. Thus, a condition is transferred from element to element by the alternating advance pulses if the static information is of different polarity than the exciting pulse. Conversely, if the stored pulse if of the same polarity, no transfer occurs and therefore both of the static remanence conditions offer an identifying output condition.

The alternation of pulses at output leads 63 and 64 of the driver causes each bank 30, 31 of magnetic elements to successively pass along the statically stored magnetic information to the next bank upon the receipt of each register advance pulse from the scanning switch 38 along lead 40. Accordingly each time an advance pulse is presented, the state of each corresponding storage element in each of the banks is successively passed on to the storage element of the next bank so that a step-by-step magnetic shift is effected. The scanning switch 38 causes the shifting to complete one cycle to return the principal register to its initial condition, thereby effecting transfer of the entire gamut of stored information to the storage indicator 35 by the pulses induced in winding 73 of the column 30 of the last bank 30, 31. The flip flop circuits 27 transfer the pulses and isolate the output circuits from the principal register 28. As described in Chapter VIII on page 10 of the Harvard Progress Report identified above, the flip-flops 27 can be reset by any pulse occurring before information is transferred out of the last core 33, such as by one of the advance pulses. One way of resetting the flip-flop 27 by the advance pulses is shown in FIG. 1 wherein voltage pulses appearing across a resistor 74 connected in series with the shift windings 72 of the output cores 33, when shift pulses are applied thereto over lead 64 from the advance driver 41, are applied to the reset terminal of the flip-flop. The resistance value of the resistor 74 should be low preferably in the order of a few ohms, in order to minimize power dissipation in the resistor.

The transferred indication is thereafter retained on the read-out register of the storage indicator 35 until a suitable reset signal is provided, after which time the indicating cycle may be repeated upon the receipt of a further read-out signal. The reset signal may be provided just prior to the read-out signal, if desired, so that there is no possibility of a false indication because of a signal held on the indicator register 35 at the time read-out is desired.

Figures 2, 3:
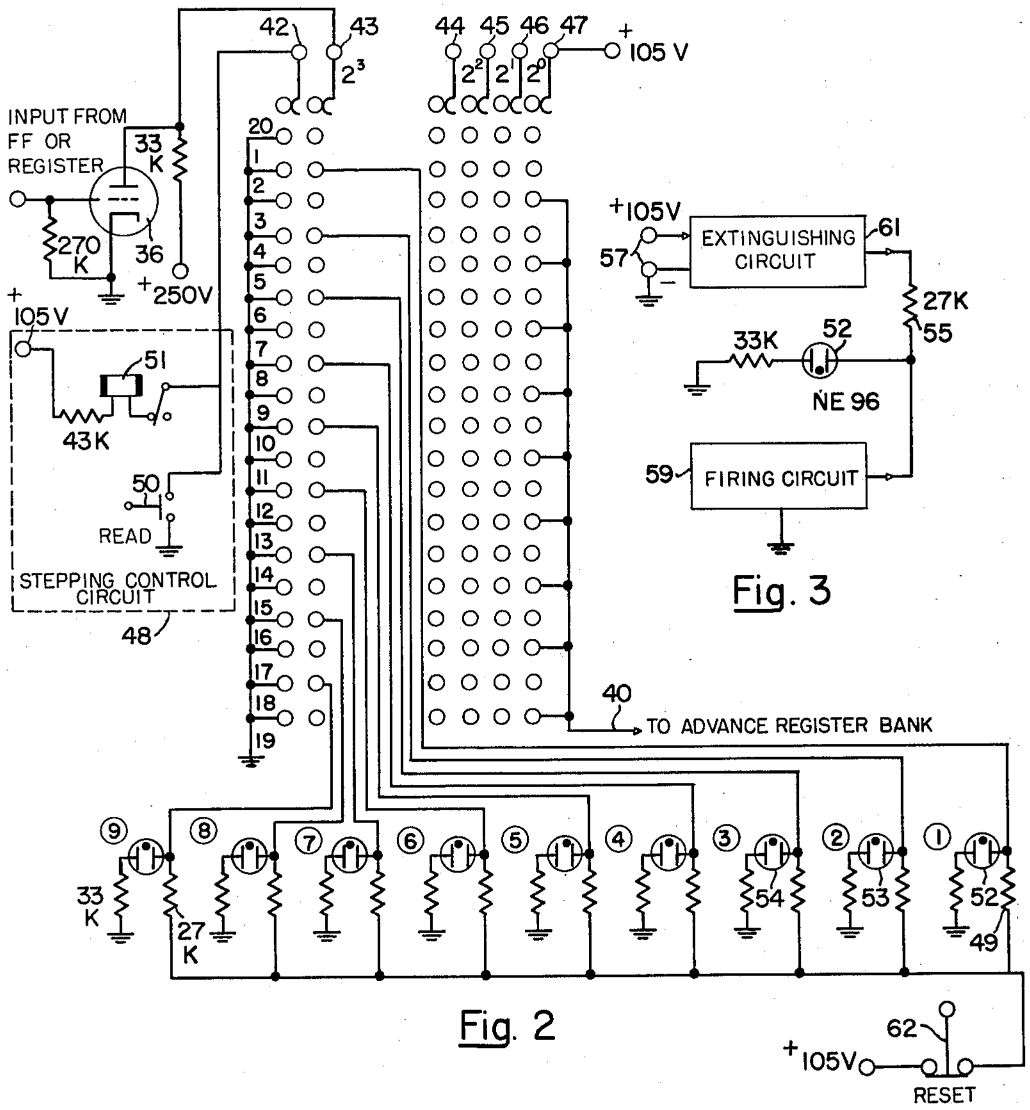
FIG. 2 is a detailed circuit diagram of a storage indicator system constructed in accordance with the invention to transfer information from a computer register to an indicating panel.
FIG. 3 is a simplified circuit diagram of a bistable state neon tube discharge circuit used in accordance with the invention.

With this general operational theory in mind, the more detailed scanning switch circuit of FIG. 2 may be considered. Assuming that there are four bistable circuits in each bank corresponding to a four bit decimal code indication, and that those indications will be presented from the aforementioned register output leads 34 to the respective switch wiper contacts 43 to 46 by way of amplifier 36.

The illustrated switch contacts are representative of the commercially available switch obtainable from C. P. Clare Company and known as the SD–46 stepping switch. That part of the circuit utilized for advancing or stepping the wiper across the numbered contacts of the respective decks of switch contacts associated with the wiper arms 42 to 47 is enclosed in the dotted stepping control circuit block 48. In this circuit pushbutton 50 initiates a stepping cycle which carries the wiper contact 42 through the series contacts shown from the rest position 20 respectively through the contacts 1 to 19 and returning to the contact 20 where a further closing of the pushbutton 50 causes similar recycling. The wipers 43 to 47 follow in unison over a similar cyclic stepping pattern.

A ratchet mechanism (not shown) advances the wiper contacts along the switch decks after the transfer relay 51 is actuated by the "read" pushbutton 50 to initiate the stepping cycle by opening its contact thereby transferring control to the wiper contact 42 which periodically grounds one end of the relay upon successive engagement with each of the grounded control deck switch contact positions 1 to 19.

As the switch wiper contact 43 advances along the transfer deck of the stepping switch to contact number 2, an electrical pulse representative of the anode potential of the amplifier tube 36 will be presented at one electrode of the NE96 type neon tube 52. The amplifier tube 36 normally conducts to supply a potential of about 75 volts to contact 43. When tube 36 is cut off by a corresponding flip flop conduction state representing the state of one element in the last bank of the principal register there is provided at the wiper contact 43 a higher potential of about 130 volts which is above the firing potential of the neon tube 52. Accordingly, the neon tube 52 discharges to indicate the corresponding condition of the register and is maintained in its discharging condition by the 105 volt supply connected to the neon tube electrodes by pushbutton contacts 62, since the potential thereby afforded through resistor 49 is of a value in the discharge maintaining region of the neon tube. With the described NE96 tube the firing potential range is in the region of 120 to 145 volts and the maintaining potential range in the region of 61 to 92 volts for stable operation.

Similarly, as the wiper contact 43 advances along the transfer deck further neon tubes will be successively actuated as the wiper contact engages each of the evenly numbered contacts, if the principal register flip flop circuit is in the required state of operation. However, when the amplifier tube 36 is normally conducting the electrode potential of the neon tubes is not over 105 volts so that the neon tube remains in an extinguished condition.

Switch wiper contact 47 is associated with a principal register advancing deck of switch contacts so that different storage banks of the register may be electrically moved into registration with the indicator circuit at the register output leads 34 for each of the nine shown indicator lamps. Therefore, the odd numbered contacts following number one are each pulsed by the 105 volts connected to the advance deck wiper contact 47. These pulses may be used, or modified as required, for shifting the step-by-step register banks in unison with the stepping action of the switch. Each of the neon tubes 52, 53, 54 etc. will, therefore, indicate the binary bit ($2^3$) condition to spell out the binary word for the first row 37 of the register storage bank elements. The remaining bit indications for the further rows 37$^1$, etc. are likewise transferred to similar indicator circuits (not shown) by operation of wiper contacts 44 to 46 along their respective transfer switch contact decks.

The neon tubes 52, 53, 54 etc. are connected in a bistable state discharge circuit in accordance with the present invention for operation in the manner readily illustrated by the simplified diagram of FIG. 3. When using a glow discharge tube such as the commercially available type NE96, a direct current potential of 105 volts may be impressed across the neon tube electrodes through resistor 55 without initiating a discharge.

When the neon tube 52 is extinguished, the 105 volts across its electrodes from the supply terminals 57 will be insufficient to overcome the firing threshold. Therefore, the firing pulse circuit 59 which may be the principal register circuit hereinbefore described, provides a positive pulse at the high potential electrode of the neon tube 52 of a potential above the firing threshold. The 105 volts normally supplied then will be sufficient to maintain the discharge in the neon tube until extinguished by operation of the extinguishing pulse circuit 61. Thus, the neon tube circuit provides a bistable indication, where the tube may be held either in an extinguished or discharging state of operation until actuated into the other state by a suitable pulse or other command operation. The extinguishing circuit 61 provides a negative pulse for reducing the neon tube potential below the maintaining threshold, and in one simple form may be merely a switch contact for interrupting the 105 volt supply circuit as shown by the reset pushbutton 62 of FIG. 2.

Some types of glow discharge tubes, such as type NE2, may have a small range of permissible maintaining potential variation or firing potential variation. To permit reliable bistable operation with these tubes without regulated power supplies, and the like, the modified circuit of FIG. 4 is preferable. This circuit was designed to afford reliable operation with a maximum desired firing potential tolerance in the range of 69 to 74 volts and a maximum desired maintaining potential tolerance in the range of 54 to 60 volts.

The two desired stable states of operation for maximum indicator reliability are obtained by firing alternatively the neon indicator tube 65 and the alternative discharge tube 66. The two discharge devices 65 and 66 each have their two electrodes connected in parallel. Accordingly, power supply means connected to terminals 57 for providing a constant potential in excess of the firing threshold potential of the neon tubes will initiate a discharge in at least one tube. A series resistor 70 or other impedance device, is however connected between one of the supply terminals 57 and the electrodes of both tubes. This resistor 70 has a value such that glow discharge current from one of the discharge tubes 65 or 66 will drop the potential across the electrodes of each device to the maintaining potential region occurring below the firing threshold potential and above the maintaining threshold potential.

Assuming only tube 65 is in a discharge condition, therefore, when means, such as the normally closed switch 62 of FIG. 4, is provided for momentarily decreasing the electrode potential of that tube 65 by interrupting its discharge path, the potential at the electrodes of the other tube 66 reaches the firing potential. After firing of the second tube 66 the potential across the parallel connected tube electrodes is not sufficient to fire the formerly discharging tube 65 because of the series resistor 70. The circuit therefore is maintained in one stable operating state or condition. In one particular embodiment the neon tube 65 may be the indicator lamp and the switch serially connected therewith may be connected as the pushbutton reset switch 62 of FIG. 2.

An externally derived positive pulse applied to the low potential electrode of the alternative neon tube 66, developed across the resistor 74 in series therewith, will serve to extinguish the discharge of that tube and, in a similar manner to that hereinbefore explained in connection with tube 66, cause the indicator tube 65 to fire. Thus, a second stable state of operation is initiated. A visual inspection of a read-out register panel containing the indicator tube 65 will readily show which internal state of operation prevails in the computer register by means of the glow discharge characteristics of the tubes.

It is readily apparent, from the foregoing description of the features of the invention that the bistable circuits of themselves may be utilized in combination with other circuits than those described, and that there has been afforded by the invention novel circuit arrangements having utility and affording improved and more efficient operation than prior art devices. Those novel features believed descriptive of the nature of the invention are defined with particularity in the appended claims.

What is claimed is:

1. The combination of an electronic computer register; a bistable state discharge circuit comprising a pair of gaseous discharge devices each having two electrodes and requiring a firing potential in excess of that required to maintain a discharge, means connecting said devices in parallel, supply means connected for providing a constant potential in excess of said firing potential to said devices, an impedance connected between the supply means and said devices of such value that glow discharge current from one device drops the potential across the other device below the firing potential and above the maintaining threshold potential; means in said computer register for momentarily interrupting the discharge path of one device in response to only one predetermined register condition to initiate one stable state; and means providing an external extinguishing potential to the other device in response to a computer reset signal to initiate the other stable state.

2. In an electronic computer, a bistable gaseous discharge tube circuit comprising, a pair of two electrode glow discharge tubes connected in parallel, means connected for providing a potential in the discharge maintaining region to said tubes, means connected for selectively decreasing the potential across one of said tubes to extinguish the discharge and establish a first stable operating condition in response to one signal derived from an electronic computer circuit, means connected for simultaneously increasing the potential on the other of said tubes above the firing potential, and means for selectively decreasing the potential to the last mentioned tube below the maintaining threshold to extinguish the discharge and thereby establish a second stable operating condition in response to a further signal derived from an electronic computer circuit.

3. In combination, a first neon type glow discharge tube, a momentary break switch connected in series circuit with said tube, a second neon type glow discharge tube, an impedance connected in series circuit with said second tube, a conductive circuit connecting both said series circuits in parallel, a power supply circuit connected to said tubes for supplying a firing potential thereto, an impedance serially connected between said tubes and said power supply of a value reducing the potential to the discharge maintaining region of the tubes when discharge current flows therethrough, and an external computer register circuit connected to said first mentioned impedance for selectively supplying an electrical pulse thereto of a magnitude sufficient to reduce the potential of the second tube below the maintaining threshold.

4. An electronic computer system comprising, in combination, an electronic register having a series of storage banks respectively indicating predetermined circuit conditions and adapted for step-by-step presentation to an external circuit, a series of indicator circuits corresponding to said series of storage banks comprising bistable glow discharge tube circuits, scanning means for respectively presenting said storage banks to said corresponding indicator circuits to transfer thereto the circuit condition indication registered on said banks, said bistable glow discharge tube circuits each comprising a pair of two electrode neon type gaseous discharge tubes connected in parallel, power supply means connected to said tubes for providing a potential exceeding the firing potential to the electrodes of the tubes; impedance means connected serially between the tube electrodes and said power supply means of such value that discharge current flowing therein will reduce the supply potential at said electrodes below the firing potential and within the maintaining region of the tubes, means for selectively extinguishing the discharge state of one of said pair of discharge tubes by momentarily reducing its potential below the maintaining potential threshold, thereby causing the other of said discharge tubes to automatically fire with said power supply potential, and means for selectively extinguishing the discharge state of the latter discharge tube by reducing its potential below the maintaining potential threshold thereby automatically causing the first discharge tube to fire.

5. An electronic computer circuit comprising in combination, an electronic register having a plurality of information storage banks adapted to advance information in a step-by-step manner to an external circuit, a scanning means comprising a plurality of banks of contacts, a first means to synchronize said scanning means with the advance of information in said electronic register, said scanning means being connected to said register in such a manner that said banks of contacts will detect information stored in said register as said information is advanced, and a circuit comprising a plurality of banks of gaseous discharge devices, each of said banks of gaseous discharge devices being associated with a particular bank of contacts of said scanning means and adapted to be ionized by signals transmitted through said scanning means and originating from said information storage banks, each of said gaseous discharge devices having a maintaining voltage, and an extinguishing voltage less than said maintaining voltage, a third means to apply said maintaining voltage to each of said gaseous discharge devices, and a fourth means to apply said extinguishing voltage to said gaseous discharge devices.

6. An electronic system comprising a register having a plurality of information storage banks and adapted to advance information stored therein in a step-by-step manner to an external circuit, a visual indicating means comprising a plurality of banks of gaseous discharge circuits, a scanning means having a plurality of banks of contacts, buffer means associating said scanning means with said register and adapted to prevent electrical signals from said scanning means entering said register, synchronizing means adapted to synchronize said advance of information in said register with said scanning means so that as the information stored in each bank of said registers is advanced the scanning means is caused to electrically associate successive banks of contacts to the register through said buffer means, the banks of contacts of said scanning means being individually associated with individual banks of gaseous discharge devices and adapted to transmit information from said information storage banks through said buffer means to said banks of gaseous discharge devices, a first means to provide a maintaining potential for said gaseous discharge circuits, and a second potential means derived from said buffer means for firing selected ones of said gaseous discharge circuits in accordance with the information stored in said information storage banks.

7. An electronic system comprising a register having a plurality of information storage banks and adapted to advance information stored therein in a step-by-step manner, a scanning means having a plurality of banks of contacts, a visual indicating means comprising a plurality of banks of gaseous discharge circuits, buffer means associating said scanning means with said register and adapted to prevent electrical signals from said scanning means entering said register, synchronizing means adapted to synchronize the advance of information in said register with said scanning means so that as the information stored in each bank of said registers is advanced the scanning means is caused to electrically associate successive banks of contacts to the register through said buffer means, individual banks of contacts being connected to individual banks of said gaseous discharge circuits so that the information presented to said scanning means by said storage banks is transmitted to corresponding banks of said gaseous discharge circuits, each of said gaseous discharge circuits comprising a first gas tube, a second gas tube connected in parallel arrangement with said first gas tube, a series combination of a first potential means and a first impedance, said series combination connected across the parallel combination of said first and second gas tubes.

8. An electronic computer system in accordance with claim 7 in which said first potential means is adapted to initaite a discharge in a first one of said gas tubes in each of said gaseous discharge circuits, and comprising a second means adapted to cause said first gas tube to be extinguished, and said second gas tube to be discharged, and a third means to extinguish said second gas tube.

9. An electronic system comprising a register having a plurality of information storage banks and adapted to advance information stored therein in a step-by-step manner, a scanning means having a plurality of banks of contacts, a visual indication means comprising a plurality of banks of gaseous discharge circuits, buffer means associating said scanning means with said register and adapted to prevent electrical signals from said scanning means entering said register, synchronizing means adapted to synchronize the advance of information in said register with said scanning means so that as the information stored in each bank of said registers is advanced the scanning means is caused to electrically associate successive banks of contacts to the register through said buffer means, individual banks of contacts being connected to individual banks of said gaseous discharge circuits so that the information presented to said scanning means by said storage banks is transmitted to corresponding banks of said gaseous discharge circuits, each of said gaseous discharge circuits comprising a pair of gaseous discharge devices each having two electrodes and each of said gaseous discharge devices requiring a firing potential in excess of that required to maintain a discharge, means connecting said devices in parallel, supply means connected for providing a constant potential in excess of said firing potential to said devices, an impedance connected between the supply means and said devices of such value that glow discharge current from one device drops the potential to said parallel connected devices below the firing potential and above the maintaining threshold potential; means in said electronic system for momentarily interrupting the discharge path of one device in response to only one predetermined register condition to initiate one stable state, reset means, and means providing an external extinguishing potential to the other device in response to a signal from said reset means to initiate the other stable state.

10. An electronic computer condition indicator comprising, in combination, a storage system including a plurality of magnetic shift registers each composed of a series of electrically coupled bistable magnetic cores along which a circuit condition is capable of being stepped by change of state of the cores, a display panel including a plurality of similar gaseous glow discharge devices each characterized by having two electrodes and requiring a higher voltage to start a discharge therein than is required to sustain a discharge therein, means for supplying a sustaining voltage across each of said devices, means for supplying successive pulses to one end of each of said shift registers for step-by-step advancement of the pulse from core to core therealong, and means electrically connecting the opposite end of each of said shift registers with at least one discharge device of said panel and responsive to a change in state of the last core in each register for providing a starting voltage to discharge the device with which the shift register is associated.

11. The combination of a magnetic core having a substantially rectangular hysteresis characteristic, means for reversing the polarity of said magnetic core between positive and negative states of substantial saturation, a gas discharge tube having two electrodes and characterized by ionizing and deionizing potentials, means for biasing said tube at a potential between said ionizing and deionizing potentials, means responsive to a reversal of said polarity to one of said states for producing a voltage, and means for applying said voltage to one of said electrodes to increase said biasing potential whereby said tube will be ionized to indicate said reversal of said polarity of said magnetic core.

12. The combination of a magnetic core, coil means linked to said core for applying magnetomotive forces of opposite polarities to said core to change the magnetization of said core respectively to two different states, a gas discharge tube having a plurality of electrodes and characterized by ionizing and deionizing potentials, means for biasing said tube at a potential between said ionizing and deionizing potentails, means including a coil linked to said core and responsive to a change of said core to one of said magnetization states for producing a voltage, and means for applying said voltage to one of said electrodes to change the state of said tube responsive to said change of the magnetization state of said core.

13. In a static information storage system, the combination of a static storage element having two states of polarizaiton, means coupled with said element for changing said element from one of its states of polarization to the other of said states, a further means coupled with said element to produce a voltage responsive to said change of state of said element, a gas discharge tube having at least two electrodes and having an ionizing potential and a lower deionizing potential, means to bias said tube at a potential between said ionizing and deionizing potentials, and means coupling said further coupled means with one of the electrodes of said tube to apply said voltage to said electrode to vary the voltage thereon to a point outside of the range between said ionizing and deionizing potentials.

14. The combination of a magnetic core having a substantially rectangular hysteresis characteristic, means for reversing the polarity of said magnetic core between positive and negative states of substantial saturation, a gas discharge tube having two electrodes, said tube being capable of being ionized and deionized at different potentials, means for biasing said tube at a potential between said ionizing and deionizing potentials, means responsive to a reversal of said core polarity to one of said states for producing a voltage, and means for applying said voltage to one of said electrodes to change the potential applied to said tube whereby said tube will be ionized to indicate said polarity of said magnetic core.

15. A static storage system comprising a first storage device including a plurality of bistable polarized elements, means for changing each of said elements from one polarity to another, and means responsive to changes of polarity of said elements to said another polarity for producing a plurality of signals each corresponding to a different one of said elements; a secondary storage device in parallel with said first storage device including a plurality of visual indicating devices each corresponding to a different one of said polarized elements and means for biasing said visual indicating devices to a sustaining potential, each of said indicating devices having two stable conditions representative respectively of said polarities, said indicating devices being responsive to said electrical signals to change from one of said stable conditions to the other; and means for changing the conditions of said indicating devices, said device changing means including means coupling said first storage device to said secondary storage device to apply said plurality of electrical signals to the corresponding ones of said indicating devices whereby the conditions of said indicating devices are representative of the polarities of the corresponding polarized elements.

16. In a static magnetic storage system of the type including a plurality of magnetic elements each having a substantially rectangular hysteresis characteristic with two conditions of substantial saturation, and means for establishing information in said system by changing the saturation conditions of said elements, the combination therewith of apparatus for indicating the information stored in said system comprising a different glow discharge tube associated with each of said elements, each of said glow discharge tubes being capable of being fired and extinguished at different potentials, means for biasing each of said glow discharge tubes between said firing and extinction potentials, means responsive to changes of saturation of said elements to one of said conditions for producing a plurality of voltages each corresponding to a different one of said elements, and means to combine each of said produced voltages with the bias of the associated glow discharge tube to place said associated glow discharge tube in a fired condition whereby the saturation condition of each said magnetic element is represented by the condition of its associated glow tube.

17. The combination of a magnetic core having a substantially rectangular hysteresis characteristic, means for applying magnetomotive forces of opposite polarities to said core to change the magnetization of said core to two opposite states, a gas discharge tube having a plurality of electrodes, said tube being capable of being ionized and deionized at different potentials, means for biasing said tube at a potential between said ionizing and deionizing potentials, means including a coil linked to said core and responsive to a reversal of said core polarity to one of said magnetization states for producing a voltage, and means for applying said voltage to one of said electrodes to change said biasing potential.

18. The combination of a magnetic core, coil means linked to said core for applying magnetomotive forces of opposite polarities to said core to change the magnetization of said core respectively to two different states, a gas discharge tube having a plurality of electrodes, said tube being capable of being ionized and deionized at different potentials, means for biasing said tube at a potential between said ionizing and deionizing potentials, means including a coil linked to said core and responsive to a reversal of said core polarity to one of said magnetization states for producing a voltage, and means coupling said voltage producing means in circuit with one of said electrodes for applying said voltage thereto to change the ionization state of said tube responsive to a change of the magnetization state of said core.

19. An electronic computer condition indicator comprising, in combination, a storage system including a magnetic shift register composed of a series of electrically coupled bistable magnetic cores which is capable of stepping a circuit condition therealong by change of state of the cores, and means for supplying pulses to an input of said shift register for step-by-step advancement of said circuit condition from core to core therealong; a display means including a plurality of similar gaseous glow discharge devices each characterized by having two electrodes and requiring a higher voltage to start a discharge therein than is required to sustain a discharge therein, and means for applying a sustaining voltage across each of said devices; and means electrically connecting an output core of said shift register with one discharge device of said display means, said connecting means being responsive to a reversal of said output core polarity for providing a starting voltage to discharge said one device.

20. A static storage system comprising a first storage device including a plurality of bistable polarized elements each having a substantially rectangular hysteresis characteristic, means for shifting the polarity of each of said elements from one stable state of substantial saturation to the opposite stable state of substantial saturation of said characteristic, separate means for each of said elements responsive to the shift from said one of said states to the other for producing an electric signal representative of said change of state; a secondary storage device including means for connecting such device in parallel with said first storage device, a plurality of visual indicating devices each corresponding to one of said polarized elements, each of said indicating devices having two stable conditions and being responsive to said electric signal to change from one of said stable conditions to the other, and separate means for each said indicating device for regulating said change of said device from said one of said stable conditions to the other; and means coupling each said indicating device to its corresponding regulating means whereby each of said indicating devices is changed to said other of said stable conditions upon said change of state of said polarized element.

21. An indicator system comprising, in combination, a storage system including a magnetic shift register composed of a series of electrically coupled bistable magnetic cores for stepping along a stored magnetic condition by changes of state of the cores, and means for changing the states of the cores; a display means including a plurality of similar glow discharge devices each having two electrodes and requiring a higher voltage to start a discharge therein than is required to sustain a discharge therein, each of said devices being associated with a different one of said cores, and means for supplying a sustaining voltage across each of said devices; and means for coupling one of said register cores with the associated one of said discharge devices, said coupling means being responsive to a reversal of said one register core polarity for providing a voltage to initiate discharge of said associated discharge device.

22. In a static information storage system, the combination of a static storage element having a substantially rectangular hysteresis characteristic and two states of remanent polarization on said characteristic, means coupled with said element for changing said element from one of its states of polarization to the other of said states, a further means coupled with said element to produce a voltage responsive to said change of state of polarization of said element, a gas discharge tube having at least two electrodes and having an ionizing potential and a lower deionizing potential, means to bias said tube at a potential between said ionizing and deionizing potentials, and means coupling said further coupled means with one of the electrodes of said tube to apply said voltage to said electrode to vary the voltage thereon to a point outside of the range between said ionizing and deionizing potentials.

References Cited in the file of this patent

UNITED STATES PATENTS

| | | |
|---|---|---|
| 2,142,106 | Boswau | Jan. 3, 1939 |
| 2,146,576 | Haselton | Feb. 7, 1939 |
| 2,310,328 | Swift | Feb. 9, 1943 |
| 2,541,041 | Crenshaw | Feb. 13, 1951 |
| 2,576,099 | Bray | Nov. 27, 1951 |